US007773689B2

(12) United States Patent
Dreps et al.

(10) Patent No.: US 7,773,689 B2
(45) Date of Patent: Aug. 10, 2010

(54) MULTIMODAL MEMORY CONTROLLERS (75) Inventors: Daniel M. Dreps, Georgetown, TX (US); Dhaval R. Sejpal, Austin, TX (US); Glen A. Wiedemeier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 11/670,491

(22) Filed: Feb. 2, 2007

(65) Prior Publication Data
US 2008/0189455 A1 Aug. 7, 2008

(51) Int. Cl.
*H04B 3/00* (2006.01)
(52) U.S. Cl. .................. 375/295; 375/257; 375/259
(58) Field of Classification Search ................ 375/257, 375/259, 295; 710/8
See application file for complete search history.

(56) References Cited
U.S. PATENT DOCUMENTS 6,566,911 B1* 5/2003 Moyer ................. 326/83

6,836,185 B1* 12/2004 Pobanz ................ 330/260
2003/0110339 A1* 6/2003 Calvignac et al. ........... 710/305
2004/0078456 A1* 4/2004 Kennedy et al. ............ 709/223

OTHER PUBLICATIONS

IBM Patent Application, U.S. Appl. No. 11/567,549, entitled "Multimodal Memory Controllers," filed Daniel M. Dreps et al. on Dec. 6, 2006.

* cited by examiner

*Primary Examiner*—David B Lugo
(74) *Attorney, Agent, or Firm*—Biggers & Ohanian, LLP (57) ABSTRACT Multimodal memory controllers are disclosed that include: a transmitter having a first input signal line, a second input signal line, a first output signal line, a second output signal line, a first single-ended driver, a second single-ended driver, a differential transmitter, and a mode control signal line, the mode control signal line having asserted upon it a mode control signal, the transmitter configured to operate the output signal lines using the single-ended drivers at a first voltage when the mode control signal is a first value and to operate the output signal lines using the differential transmitter at a second voltage when the mode control signal is a second value, and the transmitter configured to protect the differential transmitter from the first voltage when the mode control signal is the first value.

19 Claims, 8 Drawing Sheets

MULTIMODAL MEMORY CONTROLLERS

BACKGROUND OF THE INVENTION

1. Field of the Invention

The field of the invention is data processing, or, more specifically, multimodal memory controllers and methods for multimodal operation of a memory controller.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computing systems have evolved, at least two different computer memory bus architectures have emerged. On very low end computers, system designers integrate a memory controller directly into a system processor to access one or more channels of Dual In-line Memory Modules ('DIMMs') through a computer memory bus that implements a parallel, single-ended signaling protocol. Single-ended signaling is a method of transmitting electrical signals over a single signal line that is interpreted using a reference voltage. An advantage of single-ended signaling is the number of wires needed to transmit multiple signals simultaneously. If a bus needs to transmit n signals, then the bus needs to have at least n signal lines, likely more for voltage references or retiming signals. The main disadvantage of single-ended signaling is that the return currents for all the signals share the same wire and can sometimes cause interference, or crosstalk, between the signals. Such crosstalk typically limits the bandwidth of single-ended signaling systems. Examples of a parallel, single-ended signaling protocol may include Double Data Rate Two ('DDR2') or Double Data Rate Three ('DDR3'). A computer bus that implements DDR2 uses 64 data lanes to transfer data at a maximum rate of 800 megabits per second and has a power supply rail voltage of 1.8 volts. A computer bus that implements DDR3 also uses 64 data lanes, but transfers data at a maximum rate of 1600 megabits per second and has a power supply voltage rail of 1.5 volts.

On higher end computer systems that require increased bandwidth, system designers configure a memory controller to access a memory buffer through a computer memory bus that implements a serial, differential signaling protocol. Differential signaling is a method of transmitting electrical signals over a pair of signal lines such that the sum of the voltages for the signals on the pair of signal lines remains constant. Differential signaling reduces the noise on a connection by rejecting common-mode interference. The pair of signal lines are routed in parallel, and sometimes twisted together, so that they will receive the same interference. One wire carries the signal, and the other wire carries the inverse of the signal. At the end of the connection, instead of reading a single signal, the receiving device reads the difference between the two signals. Because the receiver ignores the wires' voltages with respect to ground, small changes in ground potential between transmitter and receiver do not affect the receiver's ability to detect the signal. Furthermore, the system is immune to most types of electrical interference because any disturbance that alters the voltage level on one signal line will correspondently alter the voltage on the other signal line. Examples of a serial, differential signaling protocol may include a protocol according to the Fully Buffered DIMM One ('FBDIMM1') specification and the future Fully Buffered DIMM Two ('FBDIMM2') specification. The computer bus that implements the FBDIMM1 technology uses 24 data lanes per channel to transfer data at 4.8 gigabits per second and has a power supply rail of 1.5 or 1.2 volts. FBDIMM2 is specified to transfer data up to 9.6 gigabits per second with the same 24 lanes in the future. The memory buffer, in turn, accesses the DIMMs through one or more channels using lower bandwidth computer buses implementing a protocol such as, for example, DDR2 or DDR3.

The drawback to having these two computer memory bus architectures is that system designers must design and manufacture memory controllers with separate physical interfaces—one physical interface to drive a computer memory bus that implements a parallel, single-ended signaling protocol at one voltage, and another physical interface to drive a computer memory bus that implements a serial, differential signaling protocol at another voltage. As such, system designers must also design and manufacture separate sockets into which the memory controllers connect to a motherboard for each architecture. When the memory controller is integrated into the computer processor, separate computer processor must also be designed and manufactured for each architecture. Designing and manufacturing each of these separate components for the two architectures is time-consuming and costly. Readers will therefore appreciate that there is an ongoing need for innovation in the field of memory systems and, in particular, memory controllers.

SUMMARY OF THE INVENTION

Multimodal memory controllers are disclosed that include: a transmitter having a first input signal line, a second input signal line, a first output signal line, a second output signal line, a first single-ended driver, a second single-ended driver, a differential transmitter, and a mode control signal line, the first single-ended driver connected to the first input signal line and to the first output signal line, the second single-ended driver connected to the second input signal line and to the second output signal line, the differential transmitter connected to both of the input signal lines and to both of the output signal lines, the mode control signal line having asserted upon it a mode control signal, the transmitter configured to operate the output signal lines using the single-ended drivers at a first voltage when the mode control signal is a first value and to operate the output signal lines using the differential transmitter at a second voltage when the mode control signal is a second value, and the transmitter configured to protect the differential transmitter from the first voltage when the mode control signal is the first value.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
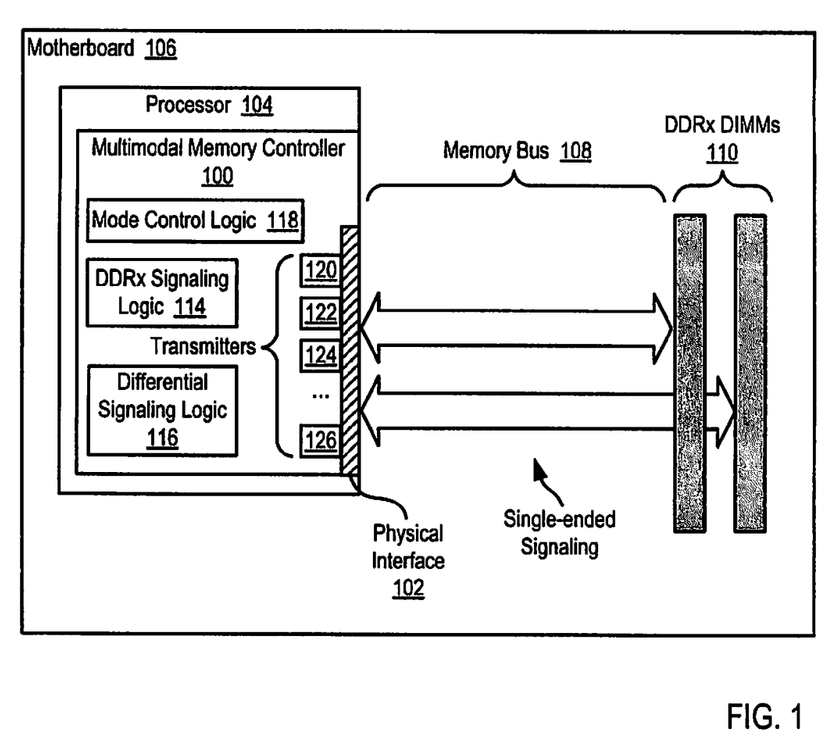
FIG. 1 sets forth a block diagram of automated computing machinery that includes an exemplary multimodal memory controller according to embodiments of the present invention.

Exemplary multimodal memory controllers and exemplary methods for multimodal operation of a memory controller in accordance with the present invention are described with reference to the accompanying drawings, beginning with FIG. 1. FIG. 1 sets forth a block diagram of an example of automated computing machinery that includes an exemplary multimodal memory controller (100) according to embodiments of the present invention. The multimodal memory controller (100) of FIG. 1 is integrated into a computer processor (104) installed on motherboard (106). Although the multimodal memory controller (100) of FIG. 1 is integrated in the processor (104), readers will note that such an implementation is for explanation and not for limitation. In fact, multimodal memory controllers according to embodiments of the present invention may be implemented as a standalone semiconductor device that connect to a system processor, as part of a bus adapter such as, for example, the Intel Northbridge, or any other implementation as will occur to those of skill in the art.

The multimodal memory controller (100) of FIG. 1 includes transmitters (120, 122, 124, 126). A transmitter is an electronic circuit that operates to transmit electronic signals to other electronic components in a computer system. Each transmitter (120, 122, 124, 126) of FIG. 1 has a first input signal line, a second input signal line, a first output signal line, a second output signal line, a first single-ended driver, a second single-ended driver, a differential transmitter, and a mode control signal line. The first single-ended driver is connected to the first input signal line and to the first output signal line. The second single-ended driver is connected to the second input signal line and to the second output signal line. The differential transmitter is connected to both of the input signal lines and to both of the output signal lines.

Each input signal line is a conductive pathway for carrying data communication signals to a transmitter from other components inside the memory controller (100) such as, for example, signaling logic. Each output signal line is a conductive pathway for carrying data communication signals from a transmitter to a component outside the memory controller such as, for example, a memory module or a memory buffer. Each transmitter (120, 122, 124, 126) of FIG. 1 utilizes its output signal lines to transmit two streams of bits when the transmitter operates the output signal lines for single-ended signaling using the single-ended drivers at a first voltage. When the transmitter operates the output signal lines for differential signaling using the differential transmitter at a second voltage, each transmitter (120, 122, 124, 126) of FIG. 1 utilizes its first and second output signal lines to transmit a single stream of bits on the pair of output signal lines.

In the example of FIG. 1, each transmitter (120, 122, 124, 126) in the exemplary multimodal memory controller (100) of FIG. 1 also includes a mode control signal line having asserted upon it a mode control signal. The mode control signal line is a conductive pathway that connects a transmitter to mode control logic (118). The mode control logic (118) is an electronic circuit for generating a mode control signal according to hardware configuration into which the memory controller is installed. A system designer may specify the value of the mode control signal generated by the mode control logic (118) using Dual In-line Package ('DIP') switches, jumper blocks, Basic Input/Output System ('BIOS') instructions, or in other manner as will occur to those of skill of the art.

When the memory controller is installed by a system designer into a low end computer system in which the memory controller communicates directly with the DIMMs, the system designer may configure the mode control logic (118) of FIG. 1 to generate a first value, such as logical zero, for the mode control signal. In such an exemplary hardware configuration, a transmitter may operate the output signal lines for single-ended signaling using single-ended drivers at 1.8 or 1.5 volts according to the DDR2 or DDR3 protocols, respectively. When the memory controller is installed by a system designer into a higher performance computer system in which the memory controller communicates directly with a memory buffer, the system designer may configure the mode control logic (118) of FIG. 1 to generate a second value, such as logical one, for the mode control signal. In such an exemplary hardware configuration, a transmitter may operate the output signal lines for differential signaling using a differential transmitter at, for example, 1.5 or 1.2 volts according to the FBDIMM protocol. In such a manner, each transmitter (120, 122, 124, 126) is configured to operate the output signal lines using the single-ended drivers at a first voltage when the mode control signal is a first value and to operate the output signal lines using the differential transmitter at a second voltage when the mode control signal is a second value. When the mode control signal is a first value, therefore, the mode control signal specifies operating the multimodal memory controller (100) in single-ended signaling mode. When the mode control signal is a second value, the mode control signal specifies operating the multimodal memory controller (100) in differential signaling mode.

The differential transmitter in each transmitter (120, 122, 124, 126) typically includes thin-oxide field effect transistors that allow each transmitter to provide high-speed, differential signaling. When the gate-source and gate-drain voltages for these thin-oxide field effect transistors exceeds a maximum voltage $V_{MAX}$, approximately 1.2 volts, damage to these thin-oxide field effect transistors often results. As such, a system designer typically designs the differential transmitter to operate using 1.2 volts or less when operating the output signal lines for differential signaling using a differential transmitter. When operating the output signal lines for single-ended signaling at a first voltage according to the DDR2 or DDR3 protocols, however, the voltage level on the output signal lines often exceeds 1.2 volts because DDR2 and DDR3 specify a voltage of 1.8 volts and 1.5 volts, respectively. In such a manner, each transmitter (120, 122, 124, 126) is configured to protect the differential transmitter from the voltage used when the mode control signal is the first value, which specifies single-ended signaling mode.

The output signal lines of each transmitter (120, 122, 124, 126) in the exemplary memory controller (100) of FIG. 1 connect to a physical interface (102). The physical interface (102) of FIG. 1 is a set of pins provided by the memory controller (100) that connect directly to the motherboard (106) or, as typically occurs, indirectly through a socket installed on the motherboard (106). Because each transmitter (120, 122, 124, 126) is configured to operate the output signal lines for single-ended signaling using single-ended drivers at a first voltage and for differential signaling using a differential transmitter at a second voltage, the physical interface (102) may advantageously connect the memory controller (100) to a computer memory bus that implements either a parallel, single-ended signaling protocol such as, for example, DDR2 or DDR3, or a serial, packetized, differential signaling protocol such as, for example, FBDIMM.

To provide electronic signals according to a signal-ended signaling protocol, the exemplary memory controller (100) includes DDRx signaling logic (114). The DDRx signaling logic (114) of FIG. 1 is an electronic circuit that generates and interprets electronic signals according to a DDR protocol such as, for example, DDR2, DDR3, or any future DDR protocol. The DDRx signaling logic (114) of FIG. 1 connects to each transmitter (120, 122, 124, 126) through the input signal lines of each transmitter (120, 122, 124, 126).

To provide electronic signals according to a differential signaling protocol, the exemplary memory controller (100) includes differential signaling logic (116). The differential signaling logic (116) of FIG. 1 is an electronic circuit that generates and interprets electronic signals according to a packetized, serial protocol such as, for example, the FBDIMM protocol. The differential signaling logic (116) of FIG. 1 connects to each transmitter (120, 122, 124, 126) through the input signal lines of each transmitter (120, 122, 124, 126).

In the example of FIG. 1, the motherboard (106) onto which the memory controller (100) is installed includes a memory bus (108) that directly connects the memory controller (100) to DDRx DIMMs (110). The memory bus (108) is a set of parallel conductive pathways that conduct electronic signals at very high frequencies, often in excess of a gigahertz, between the memory controller (100) and the DDRx DIMMs (110). DDRx DIMMs (110) are DIMMs implemented according to the DDR family of specifications such as, for example, DDR2, DDR3, and any future DDR specifications. The memory bus (108) of FIG. 1 may form a point-to-point connection or multi-drop connections between the memory controller (100) and each of the DDRx DIMMs (110). Because the motherboard (106) of FIG. 1 directly connects the memory controller (100) to DDRx DIMMs (110), a system designer configures the mode control logic (118) of FIG. 1 to assert a mode control signal having a first value. Each of the transmitters (120, 122, 124, 126), therefore, operates the output signal lines that connect to the memory bus (108) for single-ended signaling using single-ended drivers. In the example of FIG. 1, each of the transmitters (120, 122, 124, 126) operates the output signal lines according to a Double Data Rate protocol such as, for example, DDR2 or DDR3.

As mentioned above, a transmitter in a multimodal memory controller according to embodiments of the present invention may operate output signal lines for either single-ended signaling using single-ended drivers at a first voltage or differential signaling using a differential transmitter at a second voltage. FIG. 1 illustrates a transmitter that operates output signal lines for single-ended signaling using single-ended drivers at a first voltage. For further explanation, FIG. 2 sets forth a block diagram of automated computing machinery that includes a further exemplary multimodal memory controller (100) according to embodiments of the present invention in which a transmitter operates output signal lines for differential signaling using a differential transmitter at a second voltage.

Figure 2:
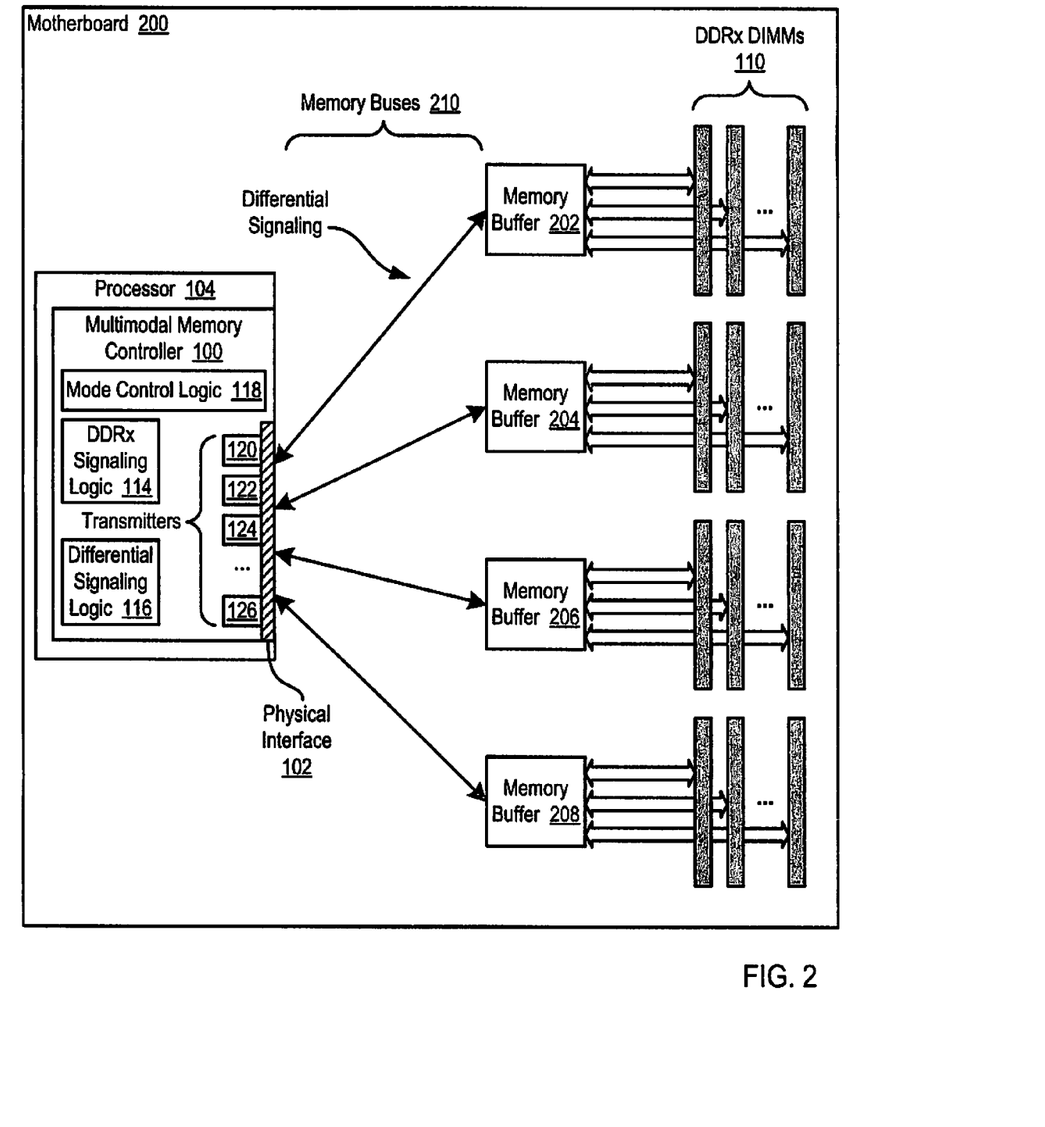
FIG. 2 sets forth a block diagram of automated computing machinery that includes a further exemplary multimodal memory controller according to embodiments of the present invention.

The multimodal memory controller (100) of FIG. 2 is the same as the multimodal memory controller (100) of FIG. 1. The multimodal memory controller (100) of FIG. 2 is installed in a processor (104) and includes transmitters (120, 122, 124, 126). Each transmitter (120, 122, 124, 126) of FIG. 1 has a first input signal line, a second input signal line, a first output signal line, a second output signal line, a first single-ended driver, a second single-ended driver, a differential transmitter, and a mode control signal line. The first single-ended driver is connected to the first input signal line and to the first output signal line. The second single-ended driver is connected to the second input signal line and to the second output signal line. The differential transmitter is connected to both of the input signal lines and to both of the output signal lines. The input signal lines of each transmitter (120, 122, 124, 126) connect to the DDRx signaling logic (114) and the differential signaling logic (116). The output signal lines connect to memory buses (210) through a physical interface (102).

Each transmitter (120, 122, 124, 126) of FIG. 2 also has a mode control signal line that connects each transmitter to a mode control logic (118). The mode control logic (118) asserts a mode control signal upon the mode control signal line. Each transmitter (120, 122, 124, 126) of FIG. 2 is configured to operate the output signal lines for single-ended signaling using single-ended drivers at a first voltage when the mode control signal is a first value and configured to operate the output signal lines for differential signaling using a differential transmitter at a second voltage when the mode control signal is a second value.

In example of FIG. 2, the multimodal memory controller (100) is installed on a motherboard (200) that connects the memory controller (100) to memory buffers (202, 204, 206, 208) through memory buses (210). Each memory buffer (202, 204, 206, 208) of FIG. 2 receives access requests from the multimodal memory controller (100) and fulfills the request by retrieving data from or writing data to DDRx DIMMs (110). Each memory buffer (202, 204, 206, 208) stores unfulfilled requests from the memory controller (100) until the memory buffer is able to satisfy the request. Similarly, each memory buffer (202, 204, 206, 208) stores retrieved data for transmission to the memory controller (100) until the memory bus (210) for the memory buffer has available bandwidth to transmit the retrieved data to the memory controller (100).

As mentioned above, the motherboard (200) of FIG. 2 connects the memory controller (100) to memory buffers (202, 204, 206, 208). In such a hardware environment, a system designer configures the mode control logic (118) of FIG. 2 to assert a mode control signal having a second value—as opposed to asserting a mode control signal having a first value as described with reference to FIG. 1. Each of the transmitters (120, 122, 124, 126), therefore, operates the output signal lines that connect to the memory buses (210) for differential signaling using a differential transmitter. In the example of FIG. 2, each of the transmitters (120, 122, 124, 126) operates the output signal lines according to a packetized, serial protocol such as, for example, the FBDIMM protocol.

As mentioned above, a transmitter includes a first single-ended driver, a second single-ended driver, and a differential transmitter. For further explanation, therefore, FIG. 3 sets forth a schematic diagram of an exemplary multimodal memory controller (100) according to embodiments of the present invention that includes a transmitter (300) having a first single-ended driver (318), a second single-ended driver (322), and a differential transmitter (320). In addition to transmitter (300), the exemplary multimodal memory controller (100) of FIG. 3 also includes transmitter (340, 342, 344). Each transmitter (300, 340, 342, 344) connects to a memory bus (332) through a physical interface (102). The memory bus (332) of FIG. 3 may be implemented using either a parallel, single-ended protocol such as, for example, DDR2 protocol or DDR3 protocol, or a serial, differential protocol such as, for example, the FBDIMM protocol because the multimodal memory controller may be configured to operate in either hardware environment.

Figure 3:
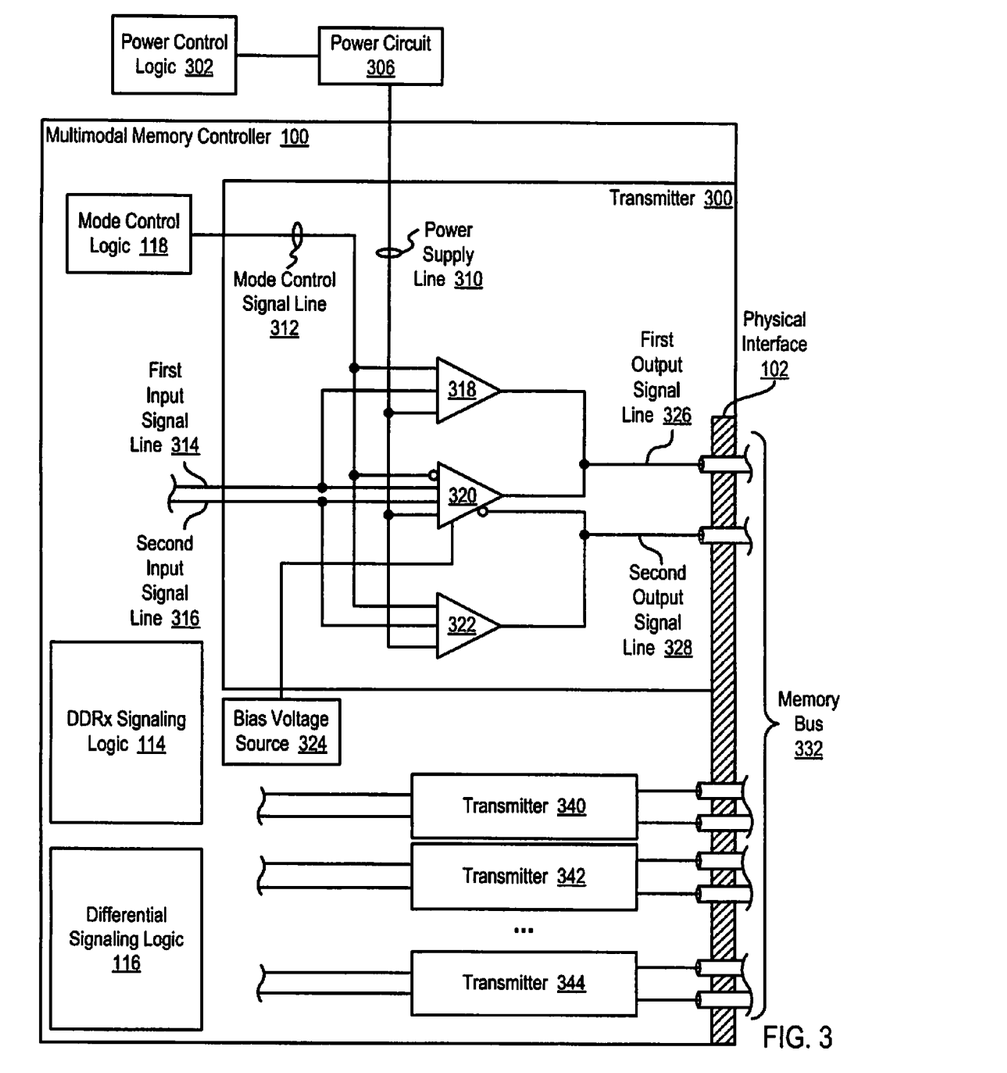
FIG. 3 sets forth a schematic diagram of an exemplary multimodal memory controller according to embodiments of the present invention.

The transmitter (300) of FIG. 3 has a first input signal line (314), a second input signal line (316), a first output signal line (326), a second output signal line (328), a first single-ended driver (318), a second single-ended driver (322), a differential transmitter (320), and a mode control signal line (312). The first single-ended driver (318) is connected to the first input signal line (314) and to the first output signal line (326). The second single-ended driver (322) is connected to the second input signal line (316) and to the second output signal line (328). The differential transmitter (320) is connected to both of the input signal lines (314, 316) and to both of the output signal lines (326, 328). The input signal lines (314, 316) connect to DDRx signaling logic (114) and differential signaling logic (116). The output signal lines (326, 328) connect to the memory bus (332) through physical interface (102).

To control whether the transmitter (300) operates the output signal lines (326, 328) for single-ended signaling or operates the output signal lines (326, 328) for differential signaling, the transmitter (300) has a mode control signal line (312). The mode control signal line (312) of FIG. 3 connects mode control logic (118) to enable inputs for the differential transmitter (320), the first single-ended driver (318), the second single-ended driver (322). The mode control logic (118) of FIG. 3 asserts a mode control signal upon the mode control signal line (312). In the example of FIG. 3, the mode control signal is a binary signal that conveys either a logical one or logical zero to the components of the transmitter (300). Because the enable input for the differential transmitter (320) complements the mode control signal, the differential transmitter (320) is disabled while the first single-ended driver (318) and the second single-ended driver (322) are enabled. Similarly, when the differential transmitter (320) is enabled, the first single-ended driver (318) and the second single-ended driver (322) are disabled. Circuitry within each of the components (318, 320, 322) of the transmitter (300) may disable the component by increasing the impedance of the component to a relatively high value compared to other enabled components, using transistor gates to isolate the disabled component, or in any other manner as will occur to those of skill in the art.

The example of FIG. 3 also includes a power circuit (306). The power circuit (306) of FIG. 3 is an electronic circuit that provides power to the components of the transmitter (300) at a plurality of voltages. In the example of FIG. 3, a power supply line (310) provides power at either a first voltage or a second voltage from the power circuit (306) to the first single-ended driver (318), the second single-ended driver (322), and the differential transmitter (320). Using such a voltage configuration along with the configuration of the mode control signal line (312), the transmitter (300) of FIG. 3 is configured to operate the output signal lines (326, 328) using the single-ended drivers (318, 322) at a first voltage when the mode control signal is a first value and to operate the output signal lines (326, 328) using the differential transmitter (320) at a second voltage when the mode control signal is a second value. For example, the transmitter (300) may be configured to operate the output signal lines (326, 328) according to a DDR protocol at 1.8 volts when the mode control signal is logical one and configured to operate the output signal lines (326, 328) according to a packetized, serial protocol at 1.2 volts when the mode control signal is logical zero. Regardless, therefore, of whether the memory bus (332) implements a bus protocol requiring single-ended signaling or differential signaling, the multimodal memory controller (100) is advantageously configured to operate in either mode.

To control the voltages supplied by the power circuit (306), the example of FIG. 3 also includes power control logic (302) connected to the power circuit (306). A system designer may configure the power control logic (302) in a manner similar to the mode control logic (118). That is, a system designer may configure the power control logic (302) using DIP switches, jumper blocks, BIOS instructions, or in other manner as will occur to those of skill of the art.

In the example of FIG. 3, the differential transmitter (320) includes thin-oxide field effect transistors that allow the transmitter (300) to provide high-speed, differential signaling. Damage typically results to these thin-oxide field effect transistors when the gate-source and gate-drain voltages for these thin-oxide field effect transistors exceed approximately 1.2 volts. When the transmitter (300) is configured to operate the output signal lines (326, 328) using singled ended-drivers according to a DDR protocol at 1.8 volts, therefore, the transmitter (300) must protect the differential transmitter (320) from the 1.8 volts when in single-ended signaling mode. In the example of FIG. 3, therefore, the transmitter (300) is configured to protect the differential transmitter (320) from the first voltage when the mode control signal is the first value—that is, when the transmitter is operating in single-ended signaling mode.

The transmitter (300) may protect the differential transmitter (320) by disabling the power supply line to a predrive logic circuit of the differential transmitter (320), isolating the predrive logic circuit from an output stage circuit of the differential transmitter (320), and biasing the transistors of the output stage to prevent a gate-source voltage for the transistors and a gate-drain voltage for the transistors from exceeding the voltage at which the transmitter (300) operates the output signal lines (326, 328) using the differential transmitter (320). The exemplary memory controller (100) includes a bias voltage source (324) for biasing the output stage transistors. The bias voltage source (324) may be implemented as one or more direct current bias voltage sources or one or more dynamically controlled bias voltage sources.

Figure 4:
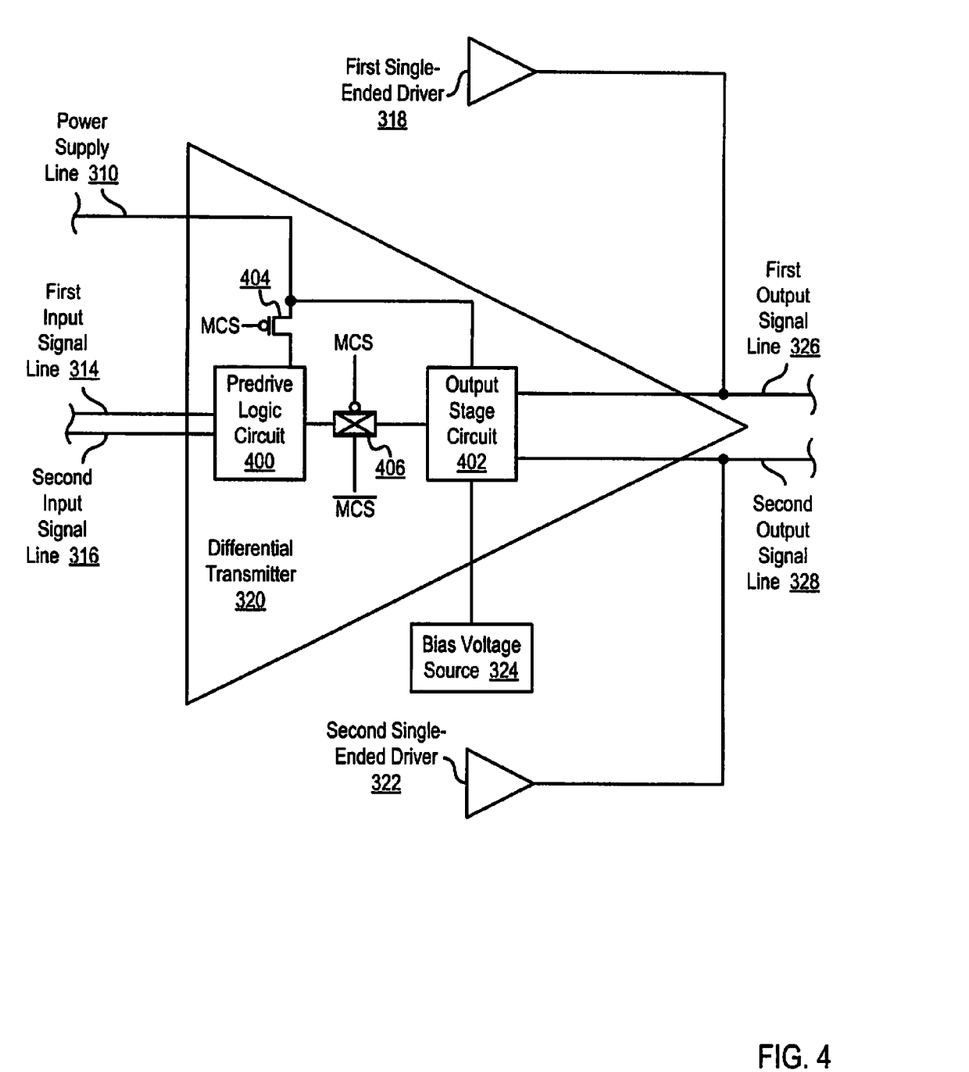
FIG. 4 sets forth a schematic diagram of a differential transmitter useful in a multimodal memory controller according to embodiments of the present invention.

For further explanation, FIG. 4 sets forth a schematic diagram of a differential transmitter (320) useful in a multimodal memory controller according to embodiments of the present invention that includes a power supply line (310), a predrive logic circuit (400), and an output stage circuit (402). The predrive logic circuit (400) is an electronic circuit that performs modulation and preprocessing for the signals received on the input signal lines (314, 316). The output stage circuit (402) is an electronic circuit that amplifies and drives the signals received from the predrive logic circuit (400) onto the output signal lines (326, 328). In the example of FIG. 4, the predrive logic circuit (400) is connected to the power supply line (310) and the input signal lines (314, 316). The output stage circuit (402) is connected to the predrive logic circuit (400), the power supply line (310), and the output signal lines (326, 328).

Readers will recall from the description above that a transmitter useful in the present invention is configured to operate the output signal lines (326, 328) using single-ended drivers (318, 322) at a first voltage when the mode control signal ('MCS') is a first value and to operate the output signal lines (326, 328) using the differential transmitter (320) at a second voltage when the mode control signal is a second value. In the example of FIG. 4, the first value and the second value for the MCS is implemented as a logical one and logical zero, respectively. Readers will also recall that the transmitter is configured to protect the differential transmitter (320) from the first voltage when the mode control signal is the first value. That is, the transmitter is configured to protect the differential transmitter (320) from the voltage at which the transmitter operates the output signal lines (326, 328) when operating in single-ended signaling mode. To protect the differential transmitter (320) from the first voltage at which a transmitter operates the output signal lines (326, 328) using single-ended drivers (318, 322), the differential transmitter includes a power transistor (404). The power transistor (404) disables the power supply line (310) to the predrive logic circuit (400) when the MCS is set for single-ended signaling mode.

The differential transmitter (320) of FIG. 4 also includes a transmission gate (406) to protect the differential transmitter (320) from the voltage at which a transmitter operates the output signal lines (326, 328) using single-ended drivers (318, 322) when operating in single-ended signaling mode. The transmission gate (406) isolates the predrive logic circuit (400) from the output stage circuit (402) that is exposed to the higher voltages that are generated in single-ended signaling mode. Although FIG. 4 illustrates only one transmission gate (404), readers will recognize that any number of transmission gates may be configured between the predrive logic circuit (400) and the output stage circuit (402) to isolate the predrive logic circuit (400) from the output stage circuit (402). Readers will also recognize that the transmission gate (406) may be omitted from some embodiments of the present invention where the final stage of the predrive logic circuit (400) is capable of handling the higher voltages that are generated in single-ended signaling mode without damage.

To further protect the differential transmitter (320) from the first voltage at which a transmitter operate the output signal lines (326, 328) using single-ended drivers (318, 322), the example of FIG. 4 includes a bias voltage source (324). The bias voltage source (324) biases at least one of the output stage transistors of the output stage circuit (402) to prevent a gate-source voltage for the transistor and a gate-drain voltage for the transistor from exceeding the second voltage utilized in differential signaling mode. The bias voltage source (324) of FIG. 4 may be implemented as a direct current bias voltage source or a dynamically controlled bias voltage source.

Figure 5:
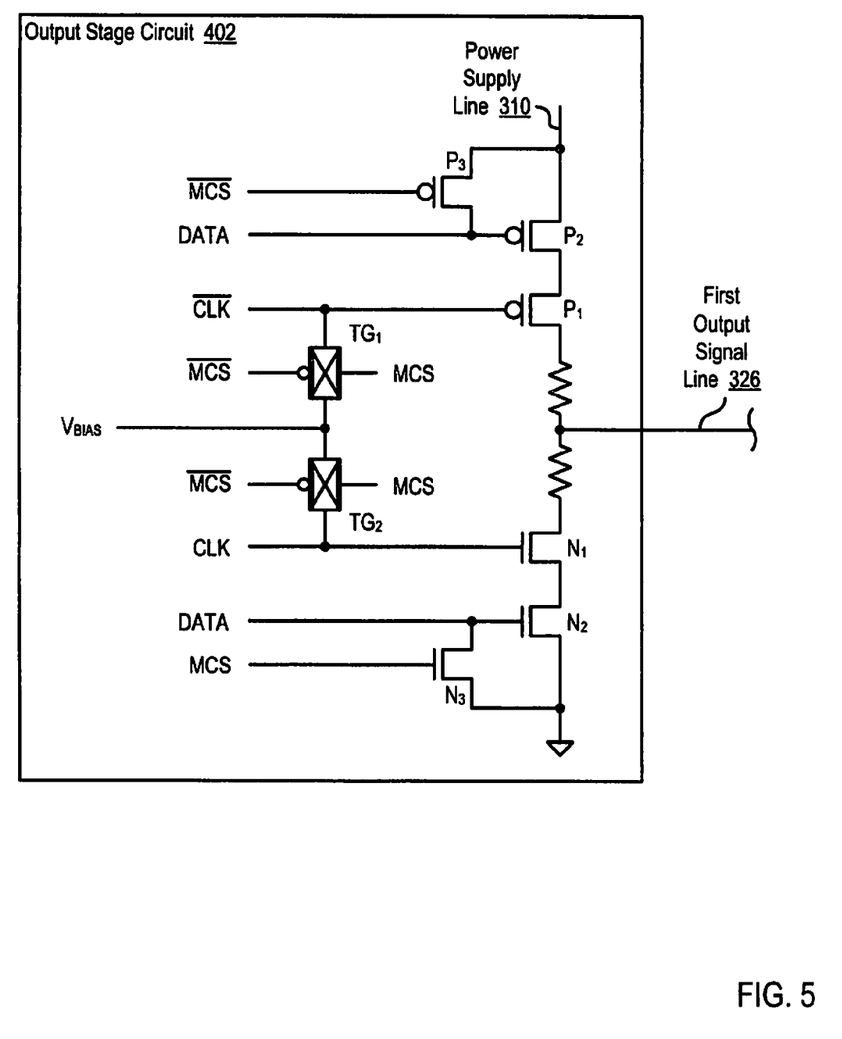
FIG. 5 sets forth a schematic diagram of an output stage circuit useful in a multimodal memory controller according to embodiments of the present invention.

For further explanation of biasing the output stage transistors, FIG. 5 sets forth a schematic diagram of an output stage circuit (402) useful in a multimodal memory controller according to embodiments of the present invention. The output stage circuit (402) has output stage transistors $P_1$, $P_2$, $P_3$, $N_1$, $N_2$, and $N_3$. In the example of FIG. 5, output stage transistors $P_1$, $P_2$, $N_1$, and $N_2$ are thin-oxide field effect transistors whose gate-source voltages and gate-drain voltages typically cannot exceed 1.2 volts without damage to the transistors.

The power supply line (310) of FIG. 5 supplies power to the output stage transistors at a plurality of voltages, including a first voltage and a second voltage. The power supply line (310) of FIG. 5 provides power to the output stage transistors at a first voltage when the MCS is a first value—that is, single-ended signaling mode—and provides power to the output stage transistors at a second voltage when the MCS is a second value—that is, differential signaling mode. In the example of FIG. 5, the first value and the second value for the MCS are implemented as a logical one and logical zero, respectively. As mentioned above, when the MCS is a first value, a transmitter useful in the present invention may operate the output signal lines using single-ended drivers (not shown) at a first voltage of 1.5 volts or 1.8 volts depending on which DDR protocol is implemented for single-ended signaling. When the MCS is a second value, a transmitter useful in the present invention operates the output signal lines using a differential transmitter at a second voltage of 1.2 volts according to the packetized, serial protocol used for differential signaling. In addition to the power supply line (310), the first output signal line (326) also provides power to the output stage transistors at a first voltage of 1.5 volts or 1.8 volts when operating in single-ended signaling mode because the MCS is a first value. Again, whether the first voltage is 1.5 volts or 1.8 volts depends on which DDR protocol is implemented for single-ended signaling.

To protect the thin-oxide output stage transistors $P_2$ and $N_2$ from excessive voltage when the MCS is a first value and the transmitter operates in single-ended signaling mode, the transistor $P_3$ biases the thin-oxide output stage transistor $P_2$ and the transistor $N_3$ biases the thin-oxide output stage transistor $N_2$. When the MCS is a first value, the output stage transistor $P_3$ drops the gate-source voltage for the thin-oxide output stage transistor $P_2$ to approximately zero volts. Similarly, the output stage transistor $N_3$ drops the gate-drain voltage for the thin-oxide output stage transistor $N_2$ to approximately zero volts when the MCS is a first value.

In the example of FIG. 5, the thin-oxide output stage transistors $P_1$ and $N_1$ are biased to prevent gate-source voltages for the transistors and gate-drain voltages for the transistors from exceeding the differential mode voltage when the transmitter is operating in single-ended signaling mode—that is, when the MCS is the first value. The output stage transistors $P_1$ and $N_1$ are biased at the gate of each transistor with the bias voltage $V_{BIAS}$. Such biasing only occurs when the output stage circuit (402) is operating in single-ended mode—that is, when the MCS is the first value. In singled-ended mode, the clock signals are disabled and the transmission gates $TG_1$ and $TG_2$ allow the bias voltage $V_{BIAS}$ to reach the gates of the output stage transistors $P_1$ and $N_1$, respectively. When the output stage circuit (402) is operating in differential signaling mode, that is, when the MCS is the second value, the clock signals are enabled and the transmission gates $TG_1$ and $TG_2$ prevent the bias voltage $V_{BIAS}$ from reaching the gates for the output stage transistors $P_1$ and $N_1$, respectively.

The bias voltage $V_{BIAS}$ in the example of FIG. 5 is provided by a bias voltage source (not shown). The bias voltage source may be implemented as a direct current bias voltage source or a dynamically controlled bias voltage source connected to a differential transmitter for biasing the output stage transistors. The actual voltage level for the bias voltage $V_{BIAS}$ typically depends on the voltage provided by the power supply line (310) when the mode control signal is the first value, that is, when the transmitters is operating in single-ended mode. For example, consider a transmitter that operates in differential mode at a voltage $V_{DIFF}$ of 1.2 volts and single-ended mode at a voltage $V_{SE}$ of 1.5 volts. When operating in single-ended mode and the power supply line (310) provides power at 1.5 volts, then a bias voltage $V_{BIAS}$ between $V_{SE}$-$V_{DIFF}$ (0.3 volts) and $V_{DIFF}$ (1.2 volts) prevents the gate-source voltages and gate-drain voltages of transistors P1 and N1 from exceeding 1.2 volts. Consider further, however, a transmitter that operates in differential mode at 1.2 volts and single-ended mode at 1.8 volts. When operating in single-ended mode and the power supply line (310) provides power at a voltage $V_{SE}$ of 1.8 volts, then a bias voltage $V_{BIAS}$ between $V_{SE}$-$V_{DIFF}$ (0.6 volts) and $V_{DIFF}$ (1.2 volts) prevents the gate-source voltages and gate-drain voltages of transistors P1 and N1 from exceeding 1.2 volts.

Readers will note that the circuit topology depicted in the schematic diagram of FIG. 5 is for explanation only and not for limitation. Other circuit topologies as will occur to those of skill in the art for biasing at least one output stage transistor of an output stage circuit may also be useful in multimodal memory controllers according to embodiments of the present invention.

When a transmitter operates in differential signaling mode, the transmitter operates the output signal lines using a differential transmitter while the single-ended drivers are disabled. Even though the single-ended drivers are disabled, however, the drivers provide a capacitive load on the output signal lines that may interfere with differential signaling. A transmitter may isolate the capacitive loading of the single-ended driver and reduce the resultant interference using T-coils. For further explanation, FIG. 6 sets forth a schematic diagram of a further exemplary multimodal memory controller (100) according to embodiments of the present invention that includes a transmitter (300) having a first single-ended driver (318), a second single-ended driver (322), and a differential transmitter (320).

Figure 6:
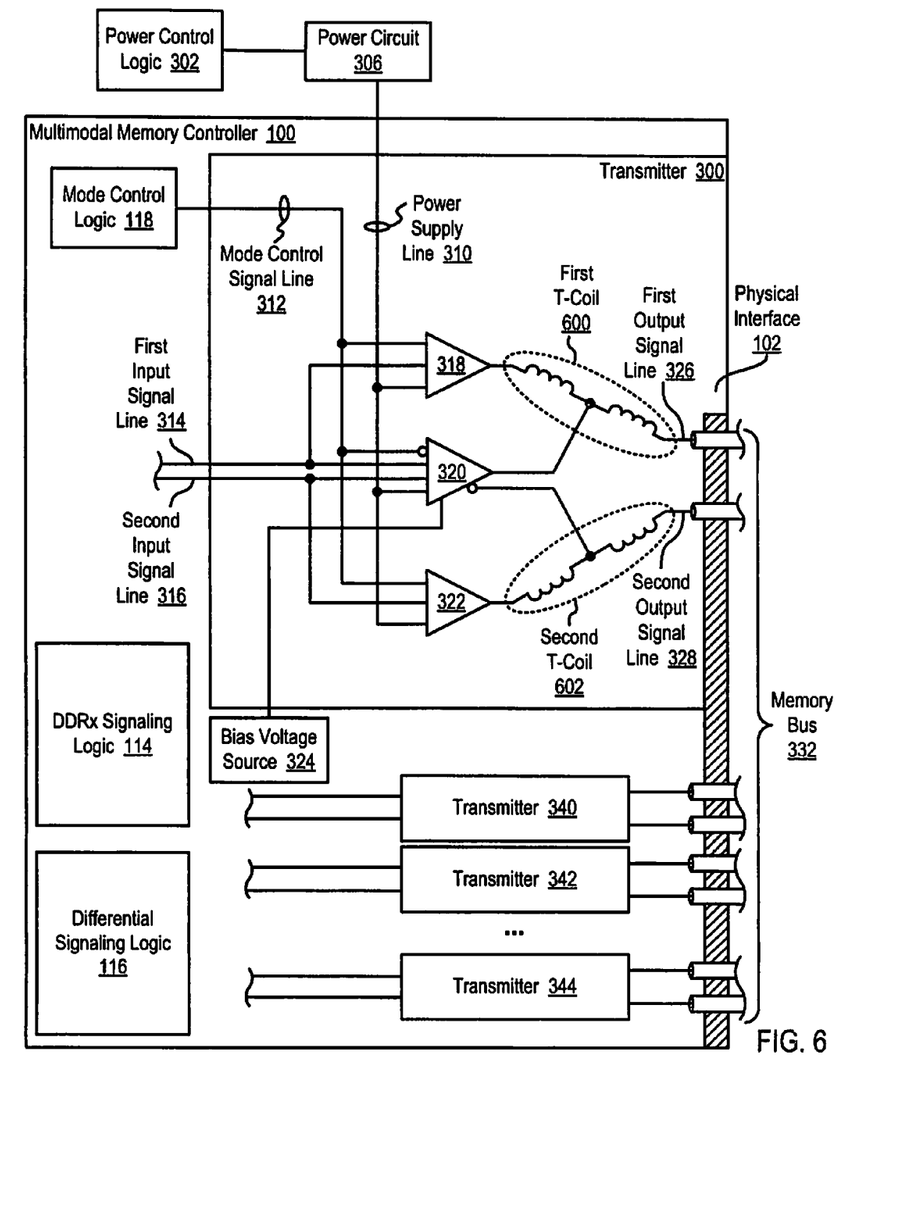
FIG. 6 sets forth a schematic diagram of a further exemplary multimodal memory controller according to embodiments of the present invention.

The first single-ended driver (318) of FIG. 6 provides a first driver load on the first output signal line (326). The first driver load is a capacitive load on the first output signal line (326) from the first single-ended driver (318). The second single-ended driver (322) of FIG. 6 provides a second driver load on the second output signal line (328). The second driver load is a capacitive load on the second output signal line (328) from the second single-ended driver (322). The differential transmitter (320) of FIG. 6 provides a differential transmitter load on both of the output signal lines (326, 328). The differential transmitter load is a capacitive load on the output signal lines (326, 328) from the differential transmitter (320).

In the example of FIG. 6, the differential transmitter load on the first output signal line (326) is isolated from the first driver load on the first output signal line (326) using a first T-coil (600). The differential transmitter load on the second output signal line (328) is isolated from the second driver load on the second output signal line (328) using a second T-coil (602). A T-coil is a pair of inductors that connects components in a T-circuit topology. In the example of FIG. 6, the first T-coil (600) of FIG. 6 is a pair of inductors that connects the first single-ended driver (318), the differential transmitter (320), and the first output signal line (326) in a T-circuit topology. The second T-coil (602) of FIG. 6 is a pair of inductors that connects the second single-ended driver (322), the differential transmitter (320), and the second output signal line (328) in a T-circuit topology.

Readers will note that the multimodal memory controller (100) of FIG. 6 is similar to the multimodal memory controller (100) of FIG. 3. The multimodal memory controller (100) of FIG. 6 includes transmitters (300, 340, 342, 344). Each transmitter connects to a memory bus (332) through a physical interface (102). The transmitter (300) of FIG. 6 has input signal lines (314, 316) and output signal lines (326, 328). The input signal lines (314, 316) connect to DDRx signaling logic (114) and differential signaling logic (116). The output signal lines (326, 328) connect to the memory bus (332) through physical interface (102).

To control whether the transmitter (300) operates the output signal lines (326, 328) for single-ended signaling or operates the output signal lines (326, 328) for differential signaling, the transmitter (300) has a mode control signal line (312). The mode control signal line (312) of FIG. 6 connects mode control logic (118) to enable inputs for the first single-ended driver (318), the second single-ended driver (322), and the differential transmitter (320). The mode control logic (118) of FIG. 6 asserts a mode control signal upon the mode control signal line (312). In the example of FIG. 6, the mode control signal is a binary signal that conveys either a logical one or logical zero to the components of the transmitter (300).

Similar to the example of FIG. 3, the example of FIG. 6 includes a power circuit (306) connected to power control logic (302). The power circuit (306) of FIG. 6 is an electronic circuit that provides power to the components of the transmitter (300) at a plurality of voltages. In the example of FIG. 6, a voltage line (310) provides power at either a first voltage or a second voltage from the power circuit (306) to the first single-ended driver (318), the second single-ended driver (322), and the differential transmitter (320). Using such a voltage configuration along with the configuration of the mode control signal line (312), the transmitter (300) of FIG. 6 is configured to operate the output signal lines (326, 328) for single-ended signaling at a first voltage when the mode control signal is a first value and to operate the output signal lines (326, 328) for differential signaling at a second voltage when the mode control signal is a second value. For example, the transmitter (300) may be configured to operate the output signal lines (326, 328) according to a DDR protocol at 1.8 volts when the mode control signal is logical one and configured to operate the output signal lines (326, 328) according to a packetized, serial protocol at 1.2 volts when the mode control signal is logical zero. Regardless, therefore, of whether the memory bus (332) implements a bus protocol requiring single-ended signaling or differential signaling, the multimodal memory controller (300) is advantageously configured to operate in either mode.

As mentioned above, exemplary methods for multimodal operation of a memory controller in accordance with the present invention are described with reference to the accompanying drawings. For further explanation, therefore, FIG. 7 sets forth a flow chart illustrating an exemplary method of multimodal operation of a memory controller according to embodiments of the present invention. The method of FIG. 7 includes receiving (700), in a transmitter of a memory controller, a mode control signal (702). The mode control single (702) of FIG. 7 represents a binary signal that conveys either a logical one or logical zero to the components of a transmitter.

The transmitter has a first input signal line, a second input signal line, a first output signal line, a second output signal line, a first single-ended driver, a second single-ended driver, and a differential transmitter. The first single-ended driver is connected to the first input signal line and to the first output signal line. The second single-ended driver is connected to the second input signal line and to the second output signal line. The differential transmitter is connected to both of the input signal lines and to both of the output signal lines.

Figure 7:
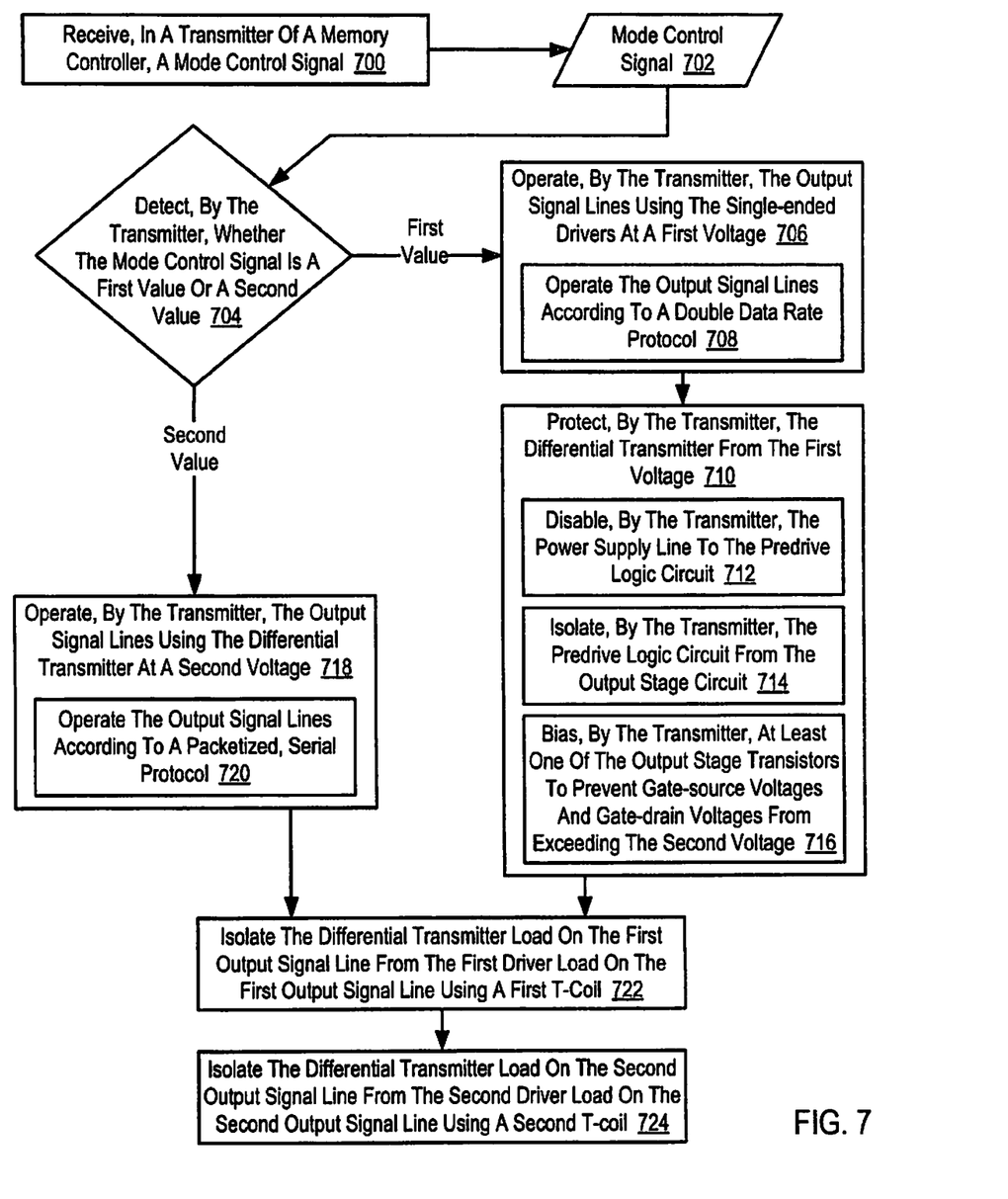
FIG. 7 sets forth a flow chart illustrating an exemplary method of multimodal operation of a memory controller according to embodiments of the present invention.

The method of FIG. 7 includes detecting (704), by the transmitter, whether the mode control signal is a first value or a second value. The transmitter may detect (704) whether the mode control signal is a first value or a second value according to the method of FIG. 7 by using a voltage comparator to compare the mode control signal to predetermined voltage thresholds that indicate the value for the voltage of the mode control signal (702).

The method of FIG. 7 includes operating (706), by the transmitter, the output signal lines using the single-ended drivers at a first voltage if the mode control signal (702) is a first value. Operating (706), by the transmitter, the output signal lines using the single-ended drivers at a first voltage if the mode control signal (702) is a first value according to the method of FIG. 7 includes operating (708) the output signal lines according to a Double Data Rate bus protocol such as, for example, the DDR2 protocol or the DDR3 protocol.

The method of FIG. 7 also includes protecting (710), by the transmitter, the differential transmitter from the first voltage if the mode control signal (702) is a first value. In the example of FIG. 7, the differential transmitter includes a power supply line, a predrive logic circuit, and an output stage circuit. The predrive logic circuit is connected to the power supply line and the input signal lines. The output stage circuit is connected to the predrive logic circuit, the power supply line, and the output signal lines. The output stage circuit includes output stage transistors. Protecting (710), by the transmitter, the differential transmitter from the first voltage if the mode control signal (702) is a first value according to the method of FIG. 7 includes disabling (712), by the transmitter, the power supply line to the predrive logic circuit if the mode control signal is the first value, isolating (714), by the transmitter, the predrive logic circuit from the output stage circuit if the mode control signal is the first value, and biasing (716), by the transmitter, at least one of the output stage transistors to prevent gate-source voltages and gate-drain voltages from exceeding the second voltage if the mode control signal is the first value.

The method of FIG. 7 also includes operating (718), by the transmitter, the output signal lines using the differential transmitter at a second voltage if the mode control signal (702) is a second value. Operating (718), by the transmitter, the output signal lines using the differential transmitter at a second voltage if the mode control signal (702) is a second value according to the method of FIG. 7 includes operating (720) the output signal lines according to a packetized, serial bus protocol such as, for example, the FBDIMM protocol.

In the example of FIG. 7, the first single-ended driver provides a first driver load on the first output signal line. The second single-ended driver provides a second driver load on the second output signal line. The differential transmitter provides a differential transmitter load on both of the output signal lines. To prevent interference, the method of FIG. 7, therefore, includes isolating (722) the differential transmitter load on the first output signal line from the first driver load on the first output signal line using a first T-coil and isolating (724) the differential transmitter load on the second output signal line from the second driver load on the second output signal line using a second T-coil.

Figure 8:
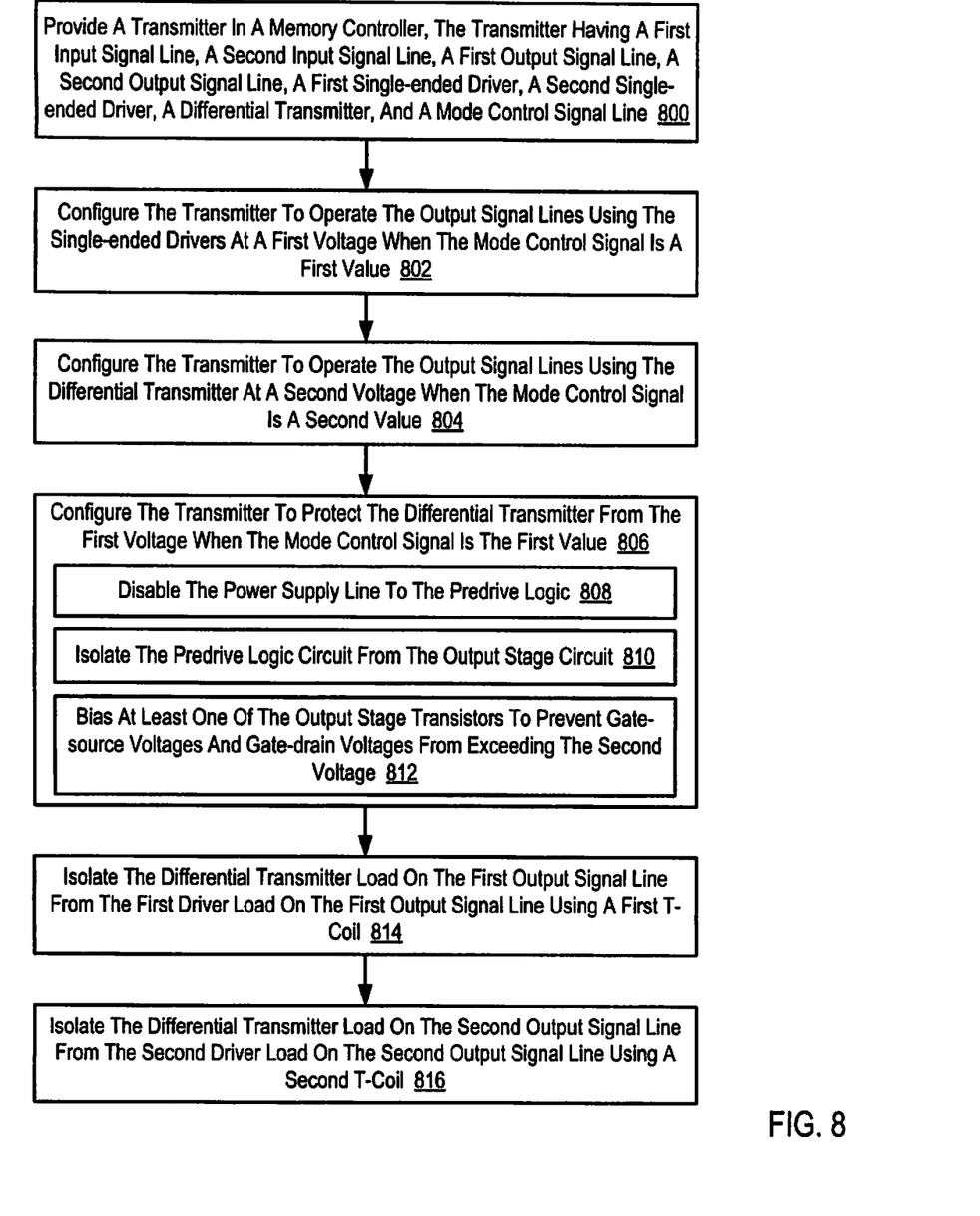
FIG. 8 sets forth a flow chart illustrating a further exemplary method of multimodal operation of a memory controller according to embodiments of the present invention.

For further explanation of exemplary embodiments the present invention, FIG. 8 sets forth a flow chart illustrating a further exemplary method of multimodal operation of a memory controller according to embodiments of the present invention. The method of FIG. 8 includes providing (800) a transmitter in a memory controller. The transmitter has a first input signal line, a second input signal line, a first output signal line, a second output signal line, a first single-ended driver, a second single-ended driver, a differential transmitter, and a mode control signal line. The mode control signal line having asserted upon it a mode control signal.

In the example of FIG. 8, the first single-ended driver is connected to the first input signal line and to the first output signal line. The second single-ended driver is connected to the second input signal line and to the second output signal line. The differential transmitter is connected to both of the input signal lines and to both of the output signal lines.

The method of FIG. 8 also includes configuring (802) the transmitter to operate the output signal lines using the single-ended drivers at a first voltage when the mode control signal is a first value. Configuring (802) the transmitter to operate the output signal lines using the single-ended drivers at a first voltage when the mode control signal is a first value according to the method of FIG. 8 includes configuring the transmitter to operate the output signal lines according to a Double Data Rate bus protocol such as, for example, the DDR2 protocol or the DDR3 protocol.

The method of FIG. 8 also includes configuring (804) the transmitter to operate the output signal lines using the differential transmitter at a second voltage when the mode control signal is a second value. Configuring (804) the transmitter to operate the output signal lines using the differential transmitter at a second voltage when the mode control signal is a second value according to the method of FIG. 8 includes configuring the transmitter to operate the output signal lines according to a packetized, serial bus protocol such as, for example, the FBDIMM protocol.

The method of FIG. 8 includes configuring (806) the transmitter to protect the differential transmitter from the first voltage when the mode control signal is the first value. In the example of FIG. 8, the differential transmitter includes a power supply line, a predrive logic circuit, and an output stage circuit. The predrive logic circuit is connected to the power supply line and the input signal lines. The output stage circuit is connected to the predrive logic circuit, the power supply line, and the output signal lines. The output stage circuit includes output stage transistors. Configuring (806) the transmitter to protect the differential transmitter from the first voltage when the mode control signal is the first value includes disabling (808) the power supply line to the predrive logic when the mode control signal is the first value, isolating (810) the predrive logic circuit from the output stage circuit when the mode control signal is the first value, and biasing (812) at least one of the output stage transistors to prevent gate-source voltages and gate-drain voltages from exceeding the second voltage when the mode control signal is the first value.

In the example of FIG. 8, the first single-ended driver provides a first driver load on the first output signal line. The second single-ended driver provides a second driver load on the second output signal line, and the differential transmitter provides a differential transmitter load on both of the output signal lines. To prevent interference, the method of FIG. 8, therefore, includes isolating (814) the differential transmitter load on the first output signal line from the first driver load on the first output signal line using a first T-coil, and isolating (816) the differential transmitter load on the second output signal line from the second driver load on the second output signal line using a second T-coil.

In view of the explanations set forth above, readers will recognize that the benefits of multimodal memory controllers according to embodiments of the present invention include:
  the same memory controller may be utilized with computer memory bus architectures that implement both a DDRx bus protocol and a packetized, serial bus protocol,
  the same socket installed on a motherboard may be used for memory controllers that control a DDRx computer memory bus and a packetized, serial computer memory bus, and system designers need only design one memory controller for both low end and high end computer systems.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A multimodal memory controller comprising:
a transmitter having a first input signal line, a second input signal line, a first output signal line, a second output signal line, a first single-ended driver, a second single-ended driver, a differential transmitter, and a mode control signal line,
the first single-ended driver connected to the first input signal line and to the first output signal line, the second single-ended driver connected to the second input signal line and to the second output signal line, the differential transmitter connected to both of the input signal lines and to both of the output signal lines,
the mode control signal line having asserted upon it a mode control signal,
the transmitter configured to operate the output signal lines using the single-ended drivers at a first voltage when the mode control signal is a first value and to operate the output signal lines using the differential transmitter at a second voltage when the mode control signal is a second value, and
the transmitter configured to protect the differential transmitter from the first voltage when the mode control signal is the first value.

2. The multimodal memory controller of claim 1 wherein:
the first single-ended driver provides a first driver load on the first output signal line;
the second single-ended driver provides a second driver load on the second output signal line; and
the differential transmitter provides a differential transmitter load on both of the output signal lines, the differential transmitter load on the first output signal line isolated from the first driver load on the first output signal line using a first T-coil, and the differential transmitter load on the second output signal line isolated from the second driver load on the second output signal line using a second T-coil.

3. The multimodal memory controller of claim 1 wherein:
the differential transmitter further comprises a power supply line, a predrive logic circuit, and an output stage circuit,
the predrive logic circuit connected to the power supply line and the input signal lines,
the output stage circuit connected to the predrive logic circuit, the power supply line, and the output signal lines,
the power supply line disabled when the mode control signal is the first value, and
the output stage circuit having output stage transistors, at least one of the output stage transistors biased to prevent a gate-source voltage for the transistor and a gate-drain voltage for the transistor from exceeding the second voltage when the mode control signal is the first value.

4. The multimodal memory controller of claim 1 wherein:
the differential transmitter further comprises a power supply line, a predrive logic circuit, and an output stage circuit,
the predrive logic circuit connected to the power supply line and the input signal lines,
the output stage circuit connected to the predrive logic circuit, the power supply line, and the output signal lines,
the power supply line to the predrive logic circuit disabled when the mode control signal is the first value,
the predrive logic circuit isolated from the output stage circuit when the mode control signal is the first value, and
the output stage circuit having output stage transistors, at least one of the output stage transistors biased to prevent a gate-source voltage for the transistor and a gate-drain voltage for the transistor from exceeding the second voltage when the mode control signal is the first value.

5. The multimodal memory controller of claim 4 wherein at least one of the output stage transistors is a thin-oxide field effect transistor.

6. The multimodal memory controller of claim 4 further comprising a direct current bias voltage source connected to the differential transmitter for biasing the output stage transistors.

7. The multimodal memory controller of claim 4 further comprising a dynamically controlled bias voltage source connected to the differential transmitter for biasing the output stage transistors.

8. The multimodal memory controller of claim 1 wherein the transmitter is configured to operate the output signal lines according to a Double Data Rate bus protocol when the mode control signal is the first value.

9. The multimodal memory controller of claim 1 wherein the transmitter is configured to operate the output signal lines according to a packetized, serial bus protocol when the mode control signal is the second value.

10. A method of multimodal operation of a memory controller, the method comprising:
receiving, in a transmitter of a memory controller, a mode control signal, the transmitter having a first input signal line, a second input signal line, a first output signal line, a second output signal line, a first single-ended driver, a second single-ended driver, and a differential transmitter, the first single-ended driver connected to the first input signal line and to the first output signal line, the second single-ended driver connected to the second input signal line and to the second output signal line, the differential transmitter connected to both of the input signal lines and to both of the output signal lines;
detecting, by the transmitter, whether the mode control signal is a first value or a second value;
operating, by the transmitter, the output signal lines using the single-ended drivers at a first voltage if the mode control signal is a first value;
operating, by the transmitter, the output signal lines using the differential transmitter at a second voltage if the mode control signal is a second value; and
protecting, by the transmitter, the differential transmitter from the first voltage if the mode control signal is a first value.

11. The method of claim 10 wherein operating, by the transmitter, the output signal lines using the single-ended drivers at a first voltage if the mode control signal is a first value further comprises operating the output signal lines according to a Double Data Rate bus protocol.

12. The method of claim 10 wherein operating, by the transmitter, the output signal lines using the differential transmitter at a second voltage if the mode control signal is a second value further comprises operating the output signal lines according to a packetized, serial bus protocol.

13. The method of claim 10 wherein the first single-ended driver provides a first driver load on the first output signal line, the second single-ended driver provides a second driver load on the second output signal line, and the differential transmitter provides a differential transmitter load on both of the output signal lines, the method further comprising:
   isolating the differential transmitter load on the first output signal line from the first driver load on the first output signal line using a first T-coil; and
   isolating the differential transmitter load on the second output signal line from the second driver load on the second output signal line using a second T-coil.

14. The method of claim 10 wherein: the differential transmitter further comprises a power supply line, a predrive logic circuit, and an output stage circuit; the predrive logic circuit connected to the power supply line and the input signal lines; the output stage circuit connected to the predrive logic circuit, the power supply line, and the output signal lines; the output stage circuit further comprises output stage transistors; and protecting, by the transmitter, the differential transmitter from the first voltage if the mode control signal is a first value further comprises:
   disabling, by the transmitter, the power supply line to the predrive logic circuit if the mode control signal is the first value;
   isolating, by the transmitter, the predrive logic circuit from the output stage circuit if the mode control signal is the first value; and
   biasing, by the transmitter, at least one of the output stage transistors to prevent gate-source voltages and gate-drain voltages from exceeding the second voltage if the mode control signal is the first value.

15. A method of multimodal operation of a memory controller, the method comprising:
   providing a transmitter in a memory controller, the transmitter having a first input signal line, a second input signal line, a first output signal line, a second output signal line, a first single-ended driver, a second single-ended driver, a differential transmitter, and a mode control signal line,
   the first single-ended driver connected to the first input signal line and to the first output signal line, the second single-ended driver connected to the second input signal line and to the second output signal line, the differential transmitter connected to both of the input signal lines and to both of the output signal lines, and
   the mode control signal line having asserted upon it a mode control signal;
   configuring the transmitter to operate the output signal lines using the single-ended drivers at a first voltage when the mode control signal is a first value;
   configuring the transmitter to operate the output signal lines using the differential transmitter at a second voltage when the mode control signal is a second value; and
   configuring the transmitter to protect the differential transmitter from the first voltage when the mode control signal is the first value.

16. The method of claim 15 wherein: the differential transmitter further comprises a power supply line, a predrive logic circuit, and an output stage circuit; the predrive logic circuit connected to the power supply line and the input signal lines; the output stage circuit connected to the predrive logic circuit, the power supply line, and the output signal lines; the output stage circuit further comprises output stage transistors; and configuring the transmitter to protect the differential transmitter from the first voltage when the mode control signal is the first value further comprises:
   disabling the power supply line to the predrive logic when the mode control signal is the first value;
   isolating the predrive logic circuit from the output stage circuit when the mode control signal is the first value; and
   biasing at least one of the output stage transistors to prevent gate-source voltages and gate-drain voltages from exceeding the second voltage when the mode control signal is the first value.

17. The method of claim 15 wherein the first single-ended driver provides a first driver load on the first output signal line, the second single-ended driver provides a second driver load on the second output signal line, and the differential transmitter provides a differential transmitter load on both of the output signal lines, the method further comprising:
   isolating the differential transmitter load on the first output signal line from the first driver load on the first output signal line using a first T-coil; and
   isolating the differential transmitter load on the second output signal line from the second driver load on the second output signal line using a second T-coil.

18. The method of claim 15 wherein configuring the transmitter to operate the output signal lines using the single-ended drivers at a first voltage when the mode control signal is a first value further comprises configuring the transmitter to operate the output signal lines according to a Double Data Rate bus protocol.

19. The method of claim 15 wherein configuring the transmitter to operate the output signal lines using the differential transmitter at a second voltage when the mode control signal is a second value further comprises configuring the transmitter to operate the output signal lines according to a packetized, serial bus protocol.

* * * * *